(12) United States Patent
Fan et al.

(10) Patent No.: US 8,908,109 B2
(45) Date of Patent: *Dec. 9, 2014

(54) REMOTE CONTROL WITH CONTENT MANAGEMENT

(71) Applicant: AT&T Intellectual Property I, L.P., Atlanta, GA (US)

(72) Inventors: James W. Fan, San Ramon, CA (US); Jennifer K. Lam, Fremont, CA (US)

(73) Assignee: AT&T Intellectual Proprty I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/293,874

(22) Filed: Jun. 2, 2014

(65) Prior Publication Data

US 2014/0285724 A1 Sep. 25, 2014

Related U.S. Application Data

(63) Continuation of application No. 11/847,648, filed on Aug. 30, 2007, now Pat. No. 8,743,294.

(51) Int. Cl.
| | |
|---|---|
| H04N 5/44 | (2011.01) |
| H04N 21/41 | (2011.01) |
| H04N 5/445 | (2011.01) |
| H04N 21/475 | (2011.01) |
| H04N 21/441 | (2011.01) |
| H04N 21/45 | (2011.01) |
| G07C 9/00 | (2006.01) |
| H04N 21/643 | (2011.01) |
| H04N 21/422 | (2011.01) |

(52) U.S. Cl.
CPC ......... *H04N 5/44582* (2013.01); *H04N 5/4403* (2013.01); *H04N 21/4126* (2013.01); *H04N 21/4751* (2013.01); *H04N 21/441* (2013.01); *H04N 21/4532* (2013.01); *G07C 9/00134* (2013.01); *H04N 21/64322* (2013.01); *H04N 21/42204* (2013.01); H04N 2005/4442 (2013.01); *G07C 9/00031* (2013.01); H04N 2005/4444 (2013.01); *H04N 21/42207* (2013.01); H04N 2005/4408 (2013.01); *H04N 21/42208* (2013.01); H04N 2005/4407 (2013.01)
USPC ........................................... 348/734; 725/46

(58) Field of Classification Search
CPC ........... H04N 5/4403; H04N 5/44582; H04N 21/4126; H04N 21/42204; H04N 21/42207; H04N 21/42208; H04N 21/4221; H04N 21/4222; H04N 21/4532
USPC ......................................................... 348/734
See application file for complete search history.

(56) References Cited

U.S. PATENT DOCUMENTS

| | | |
|---|---|---|
| 6,359,661 B1 | 3/2002 | Nickum |
| 6,493,688 B1 | 12/2002 | Das et al. |

(Continued)

*Primary Examiner* — Jeremy Duffield
(74) *Attorney, Agent, or Firm* — Jackson Walker L.L.P.

(57) ABSTRACT

A remote control unit includes stored user profiles to facilitate and possibly limit access to media content. In some embodiments, a biometric sensor or smart card reader provides user authentication to access stored user profiles. User profiles are associated with content sets that include content selected for potential viewing by the user. The remote control unit is enabled for bidirectional communication with a set-top box or modem that permits access to media content from a bidirectional service provider network.

20 Claims, 2 Drawing Sheets

(56) References Cited

U.S. PATENT DOCUMENTS

| | | |
|---|---|---|
| 6,970,098 B1 | 11/2005 | Adams et al. |
| 7,653,073 B2 | 1/2010 | Dowker |
| 7,774,811 B2 | 8/2010 | Poslinski et al. |
| 2003/0070168 A1 | 4/2003 | Stone |
| 2003/0115378 A1 | 6/2003 | Zondervan et al. |
| 2003/0151909 A1 | 8/2003 | Sid |
| 2004/0124247 A1 | 7/2004 | Watters |
| 2005/0132420 A1 | 6/2005 | Howard et al. |
| 2006/0026637 A1 | 2/2006 | Gatto et al. |
| 2006/0041916 A1 | 2/2006 | McQuaide, Jr. |
| 2006/0048194 A1 | 3/2006 | Poslinski |
| 2007/0277195 A1 | 11/2007 | Nishigaki |

REMOTE CONTROL WITH CONTENT MANAGEMENT

The present patent application is a continuation of a previously filed patent application, U.S. patent application Ser. No. 11/847,648, filed Aug. 30, 2007, the entirety of which is hereby incorporated by reference. Pursuant to 37 CFR §1.78 (a)(3), an application data sheet containing a reference to the previously filed application, unless submitted previously, is submitted contemporaneously herewith.

BACKGROUND

1. Field of the Disclosure

The present disclosure relates to remote control units with user authentication features for managing access to media content.

2. Description of the Related Art

Many users receive television and other media content using set-top boxes that communicate with provider networks through coaxial cables, satellite dishes, digital subscriber lines (DSL), or WiMAX connections, as examples. In order to receive media content such as video-on-demand, pay-per-view, and email, a user may be required to present the provider network with personal identification number ("pin") codes, parental control codes, credit card numbers, or other authenticating information.

DESCRIPTION OF THE EMBODIMENT(S)

Figure 1:
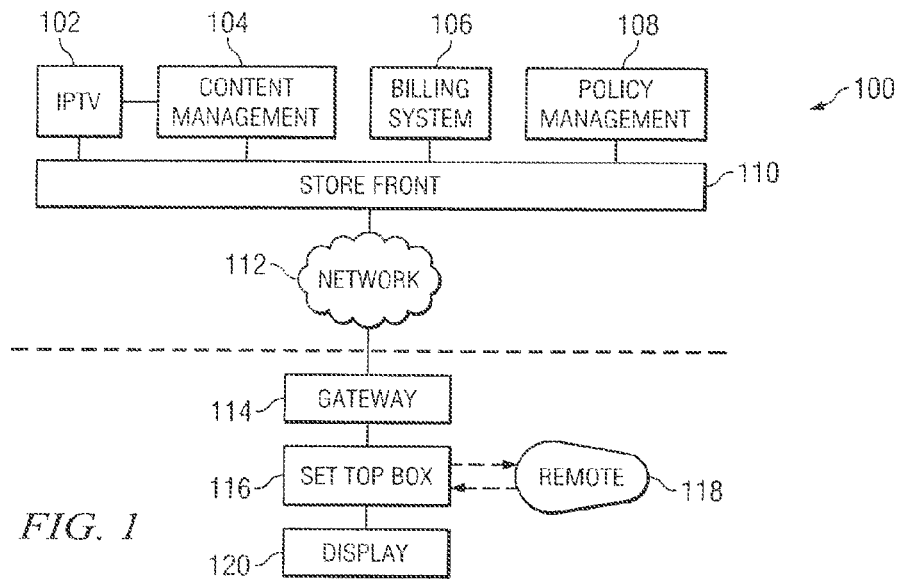
FIG. 1 is a depiction of a provider network including a set-top box controlled by an embodied a remote control unit.

In a particular embodiment, a remote control unit includes a processor, a transmitter, and a memory. The transmitter is for outgoing communication with a set-top box or other modem. The memory is for storing a plurality of profiles wherein each of the plurality of profiles corresponds to a content set. The remote control unit includes a program mode for editing the plurality of profiles. An authorization mode is for setting a current content set as one of the plurality of content sets corresponding to the plurality of profiles. A default mode is for prompting the modem to allow access to a first predetermined content set. An operation mode is for requesting first content from the modem. The first content corresponds to the current content set.

As an additional aspect, some embodied remote control units include a receiver for receiving incoming communication with the modem. The receiver may be incorporated with the transmitter as a transceiver. In some embodiments, the modem is for bidirectional communication in a communications network, which may provide IPTV content. In some embodiments, the remote control unit includes a biometric sensor for associating a present user of the remote control unit with one or more of the plurality of profiles. The one or more of the plurality of profiles may include stored fingerprint data, voice data, or retina data, as examples. The remote control unit and the modem may be enabled to synchronize with each other a portion of the plurality of profiles. In some embodiments, the remote control unit includes an input for receiving data from a smart card. The smart card may include user profile data, including biometric data.

In some embodiments, the network includes an IPTV platform unit for providing the modem with IPTV content. The IPTV platform unit communicates with a content management system for controlling access of the set-top box or modem to IPTV content. Additionally, in some embodiments, the set-top box or modem provides video service, voice service, and data service.

Another embodiment is a system for managing access to media content received from a bidirectional network. The system includes a remote control unit for communicating in a bidirectional manner with a set-top box wherein the set-top box is for receiving a plurality of packets from the bidirectional network. The system includes a plurality of user profiles and each of the plurality of user profiles is associated with a content set. Each content set is configured to permit receiving a corresponding portion of the plurality of packets. An authentication mode is for determining which of the plurality of content sets should be the current content set. An administrator profile has authority to edit each of the plurality of user profiles and has authority to edit each content set. A program mode included in the system is for programming a first user profile and a first content set associated with a first user. A default profile is for allowing the first user access to a first predetermined content set. In some embodiments, the plurality of user profiles are stored in a memory in the remote control unit and may also be stored in the set-top box unit. The bidirectional network includes an IPTV module in communication with a content management system. A storefront module is for verifying a user's payment status, and the storefront module may interact with the content management system to present a content list to the set-top box. In some embodied systems, the storefront module verifies available bandwidth for sending the packets to the set-top box. As an additional aspect, the content management system may direct the IPTV module to grant digital management rights to the set-top box.

An additional disclosed embodiment is a method for accessing IPTV content in a bidirectional provider network. The method includes storing a plurality of user profiles on a remote control unit. Each stored user profile is associated with a corresponding content set. The method includes determining whether a current user of the remote control unit has a stored profile. If the user has a stored profile, the method includes accessing the current user's corresponding content set and providing the user IPTV content based on the current user's corresponding content set. If the user does not have a stored profile, the method includes accessing a default content set and providing the user IPTV content based on the default content set.

When providing media to users, many media providers provide "triple play services" including video, voice, and data service components. For video services that include television (e.g., IPTV), a user typically employs a remote control unit as the main interface to specify which programming the user receives. A user ideally operates the remote control unit with one hand. In most systems, gaining access to video-on-demand ("VoD"), pay-per-view ("PPV") and other such services requires a user to input multiple numbers or codes. To provide a better user experience, disclosed embodiments have enhanced identity and content management features for inputting parental control codes, credit card numbers, and otherwise when accessing media content. Disclosed embodiments tend to reduce the number of key strokes required to access programming while adding a level of security to prevent compromising parental control pins or the credit card numbers.

When receiving media content from a provider network, the media content is often received through a "converter" box, a set-top box or other form of modulator/demodulator ("modem"). For example, IPTV is typically received through a set-top box. Such devices are necessary if a television or other video display unit is incapable of directly processing incoming signals from the provider network. Set-top boxes are typically controlled with a remote control unit operated by one or more users. Disclosed embodiments allow entry and storage of authentication information in a remote control unit. Embodied remote control units store user profiles that are associated with content sets for each user. For example, a remote control unit may have a memory that is able to store up to 100 regular profiles and 20 advanced profiles. Within the advanced profiles, there may be one or more administrative profiles with access to all other profiles. In disclosed embodiments, a user sets up his or her own content set. However, administrative profiles may limit the potential content sets of other users. The administrative profile may also have an associated pin code. In some cases, the pin code is provided by network provider personnel to the person ordering the media services. The number of stored profiles may be a configurable parameter that depends on available memory. Each profile may be identified by a 4 to 5 digit code, for example, that a user enters into a remote control unit to change the "current set" of the remote control unit from a default set to the content set associated with the user. Initially and also periodically, each user may enter a program mode in an embodied remote control unit to change the channels that are available for viewing under that user's profile.

In some disclosed embodiments, one or more administrative profiles on the remote control unit allow editing of all other user profiles and content sets. A pin code or security code provided by service provider personnel allows access to the administrator profile or profiles during initial setup. For a child user, an adult with administrator privileges may set up a profile to restrict the child from accessing any media content that is intended only for mature audiences. In some embodiments, the child is able to set up his or her own profile to include programming of interest to the child, as long as the child's profile adheres to any restrictions set by the administrator. The administrator may also limit other factors associated with the child's profile, for example by setting a limit on the amount of time the child spends watching television during a week. In addition, the administrator may set a curfew for the child's profile. In other words, the administrator may limit the content set or user profile of the child so that no programming is received after 10:00 o'clock at night, for example. Still further, the administrator may allow the child or other user to have limited access to pay-per-view programming. For example, the administrator may set a limit of $20 per month to allow the child limited access to approved pay-per-view or video-on-demand media content.

Reference is now made to the attached figures, in which like-numbered elements may appear throughout the views, and some elements are omitted for clarity.

FIG. 1 illustrates a communications network 100 including an embodied remote control unit 118. As shown, remote control unit 118 communicates in a bidirectional manner by sending signals to and receiving signals from a set-top box 116. Remote-control unit 118 and set-top box 116 communicate using radio frequency ("RF") signals or infrared signals, as examples. Set-top box 116 communicates with a display 120 to provide a user with media content. As examples, the media content may be streaming video, music, e-mail, or data. As shown, set-top box 116 communicates with a network 112 through a residential gateway 114. In some embodiments, the functions of residential gateway 114 and set-top box 116 are integrated into a single appliance, such as a cable modem, a DSL modem, or the like. In other embodiments, the functionality of residential gateway 114, set-top box 116, and display 120 are integrated into a single appliance such as a digital television or computer.

As shown, communications network 100 includes an Internet Protocol Television ("IPTV") platform 102 in communication with a storefront unit 110. In accordance with disclosed embodiments, user profiles are stored in memory in remote control unit 118 and set-top box 116. As an additional aspect, some embodiments provide for storage of user profiles on IPTV platform 102. Storefront unit 110 supplies a user with options for purchasing video-on-demand ("VoD") and pay-per-view ("PPV") content over network 112. Further, storefront unit 110 communicates with a billing system 106 for verifying the credit, payment, and billing history for the user. Content management system 104 communicates through storefront 110 to present a content list of available programming (i.e., media content). In addition, storefront unit 110 interacts with a policy management unit 108 to ensure bandwidth availability in network 112 for any media content requested by the user.

Figure 2:
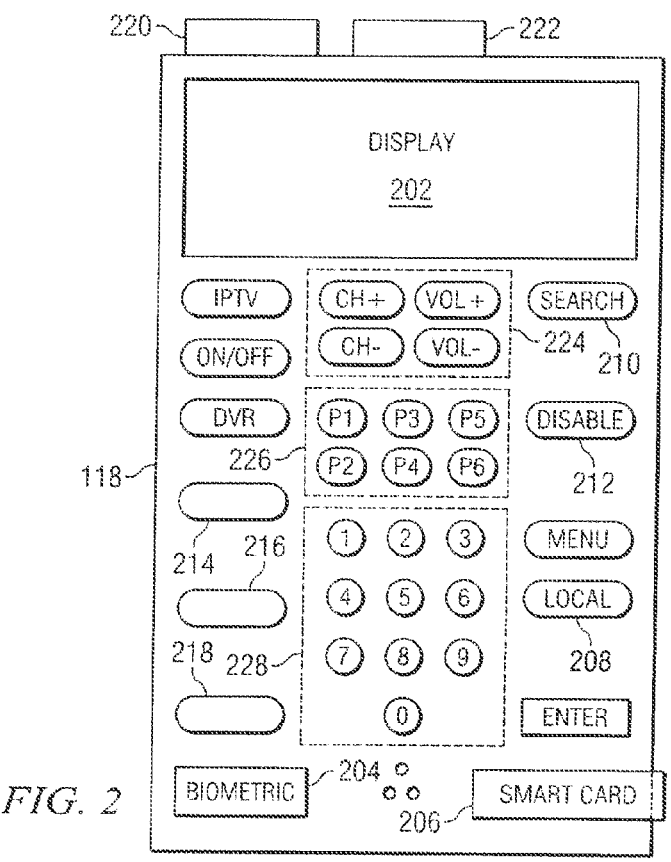
FIG. 2 illustrates features of the embodied remote control unit from in FIG. 1.
Figure 3:
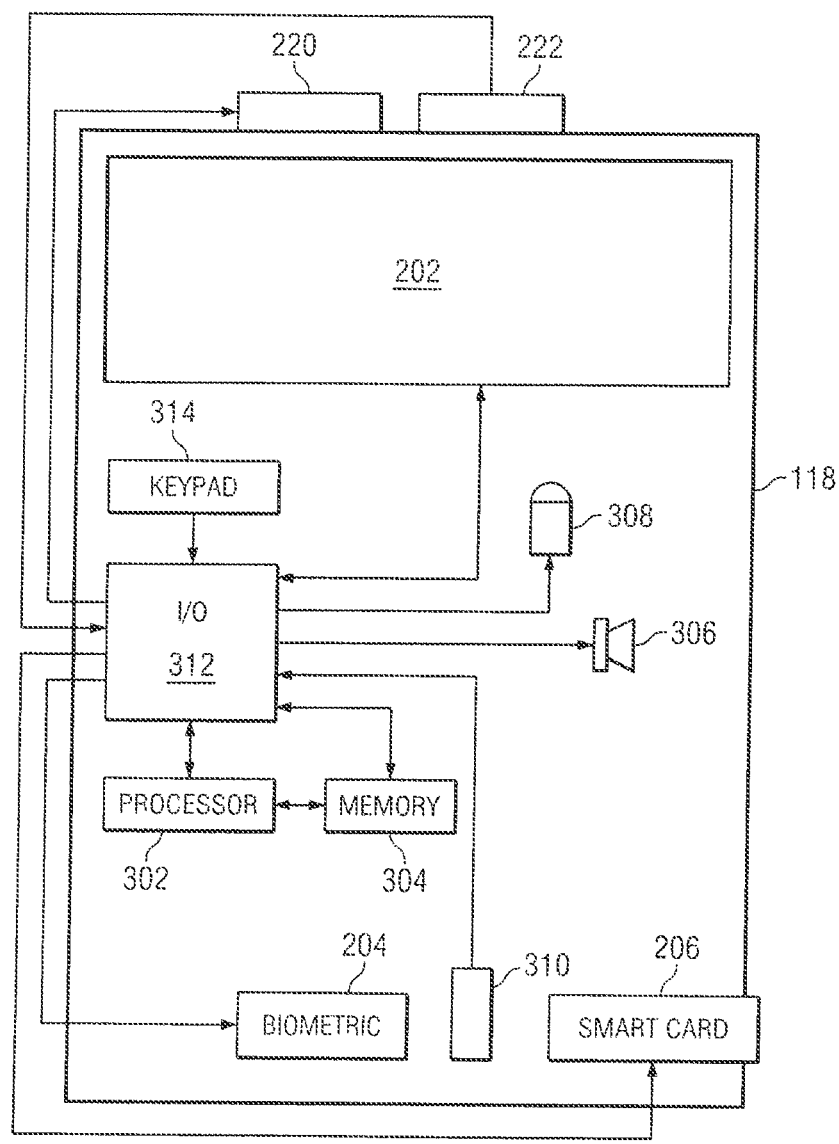
FIG. 3 illustrates hardware elements included in the embodied remote control unit from FIG. 1.

User profiles stored on remote control unit 118 or set-top box 116 may be identified with a user profile number, user profile name, or an icon displayed on either display 120 (FIG. 1) or display 202 (FIGS. 2-3). To access a user's profile, the user enters the profile number or otherwise chooses his or her profile and then enters authentication information such as a password, passkey, or biometric data. In some embodiments, upon verification of the authentication information, remote control unit 118 provides authentication information to IPTV platform 102 for access to programming. IPTV platform 102, gateway 114, set-top box 116, content management system 104, or any other component of communications network 100 may be enabled to block access to any programming not authorized for viewing by the current content set in use by remote control unit 118.

Accordingly, remote control unit 118 includes authentication features that manage media content provided to the user. The user enters an access code, biometric data, or a smart card to verify the identity of the user. Each user is associated with a profile stored on remote control unit 118. A default profile is used by remote control unit 118 if the user does not enter authentication information to access a user profile. Based on the current profile and associated content set in use by remote control unit 118, set-top box 116 through network 112 provides appropriate media content to display 120. In some embodiments, a user such as a parent or head of a household is provided with a pin code, secret code, or password by an installation technician or service representative of the network provider that is entered into the remote control unit 118 to gain access to a program mode for changing stored content sets and profiles.

FIG. 2 depicts additional features of remote control unit 118 from FIG. 1. Remote control unit 118 includes a transmitter 220 for sending signals and a receiver 222 for receiving signals from set-top box 116 (FIG. 1). Transmitter 220 may communicate with set-top box 116 using RF, infrared, or laser signals, as examples. The functions of transmitter 220 and receiver 222 may be incorporated into a single transceiver. In some cases, remote control unit 118 is programmed with the assistance of display 120 (FIG. 1), in which content sets and user profile data are projected on display 120. In other cases, remote control unit 118 operates in stand-alone mode. Accordingly, a display 202 presents a graphical interface for entering commands and profile information. Display 202 may be an LCD screen or a plasma screen, as examples.

As shown, remote control unit 118 includes other features including channel and volume controls 224 and number keypad 228. Number keypad 228 is used for entering numerical pins, credit card information, or programming selections into remote control unit 118. Programmable keys 226 are programmed to provide ready access to media content, assuming proper authorization exists with the user profile in current use by remote control unit 118. For example, a user may check his e-mail account by pressing one of programmable keys 226, assuming the user profile in use by remote control unit 118 has proper authorization to access the email account. Programmable keys 226 may be uniquely programmed by each user, which provides each user with customized programmable keys.

In some embodiments, each user profile stored in remote control unit 118 is associated with one or more content sets that are edited by the user subject to any restrictions by the administrator. After remote control unit 118 has been programmed initially, the remote control unit 118 enters an operating mode. While in operating mode, remote control unit 118 accesses a current content set. The current content set is associated with the user profile that is in use at the time. If no user profile is loaded by a user, remote control unit 118 accesses a default content set that may be altered by an administrator. A default user profile typically contains free programming (i.e., non pay-per-view) that might be acceptable to users of all ages. In some embodiments, after a user is finished with a session watching television on display 120 (FIG. 1), the user depresses a default profile button 218 to leave remote control unit 118 with the default profile as the current profile. This prevents any users remaining in the viewing session from unauthorized access to pay-per-view or adult content, for example.

As shown, remote control unit 118 includes other features. For instance, local button 208 allows the user to operate the remote as a local device. If a user wishes to create and edit profiles without interrupting viewing of programming or otherwise affecting the operation of the set-top box 116, the user may depress local button 208 to prevent the transmission of any signals from transmitter 220 during programming. When operating as a local device, any commands, user profile data, and content sets are presented on display 202. As an additional feature, remote control unit 118 includes a search button 210, which is depressed by a user to search for a profile or menu either locally or remotely. If a search is conducted locally, a list of profiles or menus is shown on display 202. If the search is conducted remotely, the list of profiles or menus is shown on display 120 (FIG. 1). In addition, remote control unit 118 includes disable auto bypass button 212. Disable auto bypass button 212 allows an administrator to prevent remote control unit 118 from automatically bypassing parental controls associated with some media content. In some embodiments, for each user profile there is a parental control auto by-pass enable option. If the option is enabled, when an administrator's fingerprint or a valid pass code is detected, the remote control unit automatically sends parental control code information to the IPTV system 102 (FIG. 1) via the set-top box for all media content that needs a parental control pin code. The disable auto bypass button 212 allows disabling the automatic sending of parental control code information for a session. This feature may be used in the event an administrator (e.g. a parent) temporarily leaves a viewing session.

As shown in FIG. 2, a biometric element 204 is used for receiving fingerprints or other biometric data. When setting up a user's profile, a user may be prompted to provide biometric evidence which is then captured and stored in the user's profile. When someone later tries to access the user's profile, the remote control unit prompts the user to verify the identity of the user by again asking for the same biometric data. The biometric data provided during operation of the remote control unit is then compared to stored biometric data and a decision is made whether to allow access to the user's profile.

Also, as shown, a smart card element 206 receives a user smartcard (not shown) that contains authentication information, credit card information, and parental pin codes, as examples. In some embodiments, a smart card contains a fingerprint image, a retina image, a password, or other such data that is unique to a user associated with the smart card. At the user's option, remote control unit 118 may download into memory the user's data from the smart card for later access. As shown, remote control unit 118 also includes a create profile button 214 that is depressed to enter a routine for programming remote control unit 118 with a user profile. In some embodiments, during initial installation of a media service such as IPTV, a user does a one-time configuration to set network parameters that may be associated with IPTV including setting a parental control code and a default credit card number for use with pay-per-view and other similar programming. Fingerprint or other biometric data may also be collected during initial setup and loaded into the IPTV from the remote control unit. In some embodiments, one or more fingerprints of a parent or other administrator are associated with a parental control code. Multiple fingerprints or biometric data may be associated with a single profile, which would be desirable if two parents wanted equal access to a single administrator account.

A user's profile may be created locally on remote control unit 118. Alternatively, the user's profile may be created remotely on set-top box 116. Regardless of whether the user's profile is created remotely or locally, profiles stored on the set-top box 116 and stored on remote control unit 118 may be synchronized. As shown in FIG. 2, a synchronization button 216 is depressed to initiate remote control unit 118 synchronizing stored profiles with set-top box 116 (FIG. 1). Synchronization is intended to prevent a user from having to repeat programming steps and other data entry when a remote is replaced or used with a different set-top box. If the administrator of the remote control unit needs to program a remote control unit for a second set-top box in a bedroom, for example, synchronization allows downloading the administrator's user profiles into the second remote control unit. In some embodiments, a user profile is associated with a remote control unit that is programmed and synchronized with a first set-top box. The remote control unit can then be used when accessing a set-top box that is remote from the first set-top box, such as in a hotel room or friend's house. In some embodiments, a user profile or plurality of profiles is configured on a storefront unit 110 (FIG. 1) remotely through network 112 (FIG. 1).

FIG. 3 illustrates, in block diagram form, selected hardware features of remote control unit 118. As shown, remote control unit 118 includes processor 302 which communicates with other hardware elements through an input-output ("I/O") module 312. Keypad module 314 receives and encodes entries made by the user to keypad 228 (FIG. 2). Memory 304 stores user profiles, default profiles, and as necessary, software components executed by processor 302. Remote control unit 118 optionally includes a speaker 306 for transmitting audible signals to a user and a microphone 310 for receiving voice signals or other audible signals from the user. In some embodiments, microphone 310 is used to receive biometric data in the form of voice data. Smart card element 206 and biometric element 204 communicate with processor 302 through I/O module 312. An optional backlight 308 is used for illuminating keypad 228 (FIG. 2) and other keys during low light conditions.

Memory 304 is for storing a plurality of user profiles. Each of the plurality of user profiles corresponds to a content set that is associated with the user profile. As an example of a user profile, a child in a household may have a profile stored in the remote control unit that is associated with a content set including cartoon channels and educational channels. One or more parents in the household may have administrative rights over the remote control unit that allows them exclusive access to program the content set associated with the child. Permissions granted to the child's content set may be based on broadcasted ratings of programming or the channels on which programs are provided. In addition, the content set may be altered by the parent to impose restrictions on the amount of time the child is allowed to spend viewing certain content. Alternatively, in a pay-per-view environment, the content set may include limitations on an amount of money the child may spend for content. Thus, content sets are stored on the remote control unit and may be modified by administrators to allow limited access to movies, television programming, video games, pay-per-view content, email content, Internet content, and the like.

The above disclosed subject matter is to be considered illustrative, and not restrictive, and the appended claims are intended to cover all such modifications, enhancements, and other embodiments which fall within the true spirit and scope of the present disclosure. For example, the disclosure of a fingerprint scanning biometric element 204 (FIGS. 2 and 3) is meant as instructive rather than limiting. Other biometric elements may be implemented such as retina scanners, voice recognition modules, or other such sensors that are enabled to uniquely identify a user. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A remote control unit, comprising:
a processor;
a local display;
a transmitter operable to communicate with a modem; and
a memory including:
 a stored plurality of profiles, each of the plurality of profiles associated with a corresponding content set and identified with a user profile name and a display icon; and
 instructions, executable by the processor, wherein the instructions, when executed by the processor, cause the processor to perform operations including:
  displaying an interface including a synchronization control, a local control, and a search control;
  setting a current content set as one of a plurality of content sets corresponding to the plurality of profiles;
  prompting the modem to display a first predetermined content set; and
  requesting first content from the modem, the first content allowed by the current content set;
  responsive to assertion of the synchronization control, synchronizing a set of profiles stored on the modem with the plurality of profiles stored in the memory;
  responsive to assertion of the local control:
   disabling the transmitter; and
   displaying commands, user profile data, and content sets on the local display; and
  responsive to assertion of the search control:
   requesting a search for an object selected from:
    a profile; and
    a menu; and
   displaying a result of the search;
   wherein the search is performed and the result is displayed:
    locally when the local control is selected; and
    remotely when the local control is not selected.

2. The remote control unit of claim 1, further comprising:
a receiver operable to communicate with the modem wherein the modem is operable to support bidirectional communication in a network for distributing multimedia content.

3. The remote control unit of claim 2, further comprising:
a biometric sensor for associating a present user of the remote control unit with a user profile in the plurality of profiles.

4. The remote control unit of claim 3, wherein a portion of the plurality of profiles includes stored fingerprint data.

5. The remote control unit of claim 2, wherein the operations include:
receiving data from a smart card, the smart card including profile data.

6. The remote control unit of claim 1, wherein the network includes an internet protocol television platform unit for providing the modem with internet protocol television content, wherein the internet protocol television platform unit communicates with a content management system for controlling access to the internet protocol television content.

7. The remote control unit of claim 1, wherein the modem is for providing video service, voice service, and data service.

8. The remote control unit of claim 1, further comprising:
a display mode for displaying the display icon as an identification of a user profile.

9. A computer readable memory device, including:
a stored plurality of profiles, each of the plurality of profiles associated with a corresponding content set and identified with a user profile name and a display icon; and
processor executable instructions which, when executed by a processor, cause the processor to perform operations including:
 displaying, by a remote control unit, an interface including a synchronization control, a local control, and a search control;
 setting a current content set as one of a plurality of content sets corresponding to the plurality of profiles;
 prompting a modem to display a first predetermined content set; and
 requesting first content from the modem, the first content allowed by the current content set;
 responsive to assertion of the synchronization control, synchronizing a set of profiles stored on the modem with the stored plurality of profiles;
 responsive to assertion of the local control:
  disabling a transmitter; and
  displaying commands, user profile data, and content sets on a local display; and
 responsive to assertion of the search control:
  requesting a search for an object selected from:

a profile; and
a menu; and
displaying a result of the search;
wherein the search is performed and the result is displayed:
locally when the local control is selected; and
remotely when the local control is not selected.

10. The computer readable memory device of claim 9, wherein the operations include:
receiving a communication from a modem operable to support bidirectional communication in a network for distributing multimedia content.

11. The computer readable memory device of claim 10, wherein the operations include:
associating a present user of the remote control unit with a user profile in the plurality of profiles based on input received from a biometric sensor.

12. The computer readable memory device of claim 10, wherein the operations include:
receiving data from a smart card, the smart card including profile data.

13. The computer readable memory device of claim 11, wherein a portion of the plurality of profiles includes fingerprint data.

14. The computer readable memory device of claim 11, wherein the operations include:
displaying the display icon as an identification of the user profile.

15. A remote control method, comprising:
displaying, by a remote control, an interface including a synchronization control, a local control, and a search control;
setting a current content set as one of a plurality of content sets corresponding to a plurality of profiles, wherein each of the plurality of profiles is associated with a corresponding content set and identified with a user profile name and a display icon;
prompting a modem to display a first predetermined content set; and
requesting first content from the modem, the first content allowed by the current content set;
responsive to assertion of the synchronization control, synchronizing a set of profiles stored on the modem with a plurality of profiles stored in a remote control memory;
responsive to assertion of the local control:
disabling a transmitter; and
displaying commands, user profile data, and content sets on a local display; and
responsive to assertion of the search control:
requesting a search for an object selected from:
a profile; and
a menu; and
displaying a result of the search;
wherein the search is performed and the result is displayed:
locally when the local control is selected; and
remotely when the local control is not selected.

16. The method of claim 15, further comprising:
receiving a communication from the modem operable to support bidirectional communication in a network for distributing multimedia content.

17. The method of claim 16, further comprising:
associating a present user of the remote control with a user profile in the plurality of profiles based on input received from a biometric sensor.

18. The method of claim 16, further comprising:
receiving data from a smart card, the smart card including profile data.

19. The method of claim 15, wherein a portion of the plurality of profiles includes fingerprint data.

20. The method of claim 15, further comprising:
displaying the display icon as an identification of the profile associated with the display icon.

* * * * *